United States Patent
Zhang et al.

(10) Patent No.: US 12,261,662 B2
(45) Date of Patent: Mar. 25, 2025

(54) CHANNEL STATE INFORMATION FEEDBACK METHOD, DEVICE, AND SYSTEM

(71) Applicant: HUAWEI TECHNOLOGIES CO., LTD., Guangdong (CN)

(72) Inventors: Yongping Zhang, Beijing (CN); Baojin Li, Beijing (CN); Huangping Jin, Shanghai (CN); Tie Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 551 days.

(21) Appl. No.: 17/213,404

(22) Filed: Mar. 26, 2021

(65) Prior Publication Data

US 2021/0234595 A1 Jul. 29, 2021

Related U.S. Application Data

(63) Continuation of application No. PCT/CN2019/106144, filed on Sep. 17, 2019.

(30) Foreign Application Priority Data

Sep. 28, 2018 (CN) .......................... 201811140024.1

(51) Int. Cl.
  *H04B 7/06* (2006.01)
  *H04B 7/0417* (2017.01)
  (Continued)

(52) U.S. Cl.
  CPC ......... *H04B 7/0626* (2013.01); *H04B 7/0417* (2013.01); *H04W 72/0453* (2013.01); *H04W 72/23* (2023.01)

(58) Field of Classification Search
  CPC .. H04B 7/0626; H04B 7/0417; H04B 7/0632; H04B 7/0634; H04B 7/065;
  (Continued)

(56) References Cited

U.S. PATENT DOCUMENTS

2012/0040622 A1  2/2012  Ren et al.
2013/0021926 A1  1/2013  Geirhofer et al.
(Continued)

FOREIGN PATENT DOCUMENTS

CN  102237969 A  11/2011
CN  102291228 A  12/2011
(Continued)

OTHER PUBLICATIONS

3GPP TS 38.211 V15.3.0 (Sep. 2018), "3rd Generation Partnership Project; Technical Specification Group Radio Access Network;NR;Physical channels and modulation(Release 15)," Sep. 2018, 96 pages.
(Continued)

*Primary Examiner* — Sharmin Chowdhury
(74) *Attorney, Agent, or Firm* — Fish & Richardson P.C.

(57) ABSTRACT

This application relates to channel state information (CSI) feedback methods and devices. One method comprises: receiving, by a terminal device from a network device, indication information of a channel state information (CSI) reporting band; determining, by the terminal device, based on the indication information, a subset of subbands in a bandwidth part configured for the terminal device for CSI reporting; determining, by the terminal device, CSI reporting priorities of the subset of the subbands based on index numbers of the subset of the subbands, wherein the index numbers of the subset of the subbands are numbered in an ascending numerical order; and sending, by the terminal device to the network device, CSI of M subbands with higher CSI reporting priorities in the subset of the subbands compared to a remainder of subbands in the subset of subbands.

14 Claims, 7 Drawing Sheets

(51) Int. Cl.
*H04W 72/0453* (2023.01)
*H04W 72/23* (2023.01)

(58) Field of Classification Search
CPC .......... H04W 72/0453; H04W 72/23; H04W 72/56; H04L 5/0023; H04L 5/001; H04L 5/0057; H04L 5/0064; H04L 5/0094; H04L 5/0053

See application file for complete search history.

(56) References Cited

U.S. PATENT DOCUMENTS

| | | | |
|---|---|---|---|
| 2015/0215928 | A1 | 7/2015 | Davydov et al. |
| 2018/0076924 | A1 | 3/2018 | Lee et al. |
| 2018/0124687 | A1 | 5/2018 | Park et al. |
| 2019/0109626 | A1* | 4/2019 | Park ............... H04B 7/0636 |
| 2019/0199420 | A1* | 6/2019 | Faxér ............... H04B 7/0639 |

FOREIGN PATENT DOCUMENTS

| | | |
|---|---|---|
| CN | 102377539 A | 3/2012 |
| CN | 103107866 A | 5/2013 |
| CN | 103391124 A | 11/2013 |
| CN | 105162508 A | 12/2015 |
| CN | 105553532 A | 5/2016 |
| CN | 108111200 A | 6/2018 |
| CN | 110086519 A | 8/2019 |
| CN | 110233654 A | 9/2019 |
| EP | 2624473 A2 | 8/2013 |
| EP | 2677671 A1 | 12/2013 |
| EP | 3537813 A1 | 9/2019 |
| EP | 3876575 A1 | 9/2021 |
| WO | 2018039860 A1 | 3/2018 |

OTHER PUBLICATIONS

3GPP TS 38.212 V15.3.0 (Sep. 2018), "3rd Generation Partnership Project; Technical Specification Group Radio Access Network;NR;Multiplexing and channel coding(Release 15)," Sep. 2018, 99 pages.

3GPP TS 38.214 V15.2.0 (Jun. 2018), "3rd Generation Partnership Project; Technical Specification Group Radio Access Network;NR; Physical layer procedures for data(Release 15)," Jun. 2018, 95 pages.

Ad-hoc Chair (Samsung), "Chairman's notes of AI 7.1.2 Maintenance for MIMO," 3GPP TSG RAN WG1 Meeting #94bis, R1-1811982, Chengdu, China, Oct. 8-12, 2018, 24 pages.

Huawei et al., "Maintenance for CSI acquisition," 3GPP TSG RAN WG1 Meeting #94bis, R1-1810099, Chengdu, China, Oct. 8-12, 2018, 6 pages.

Office Action issued in Chinese Application No. 201910408724.2 on Feb. 13, 2020, 13 pages (with English translation).

Office Action issued in Chinese Application No. 201910408857.X on May 22, 2020, 6 pages (with English translation).

Office Action issued in Chinese Application No. 201910408857.X on Feb. 13, 2020, 12 pages (with English translation).

PCT International Search Report and Written Opinion issued in International Application No. PCT/CN2019/106144 on Nov. 28, 2019, 15 pages (with English translation).

Samsung, "Issues on the trigger state definition," 3GPP TSG RAN WG1 Meeting #92, R1-1801958, Athens, Greece, Feb. 26-Mar. 2, 2018, 5 pages.

Extended European Search Report issued in European Application No. 1986526406 on Oct. 11, 2021, 12 pages.

3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.

Office Action issued in Chinese Application No. 201811140024.1 on Jun. 1, 2022, 6 pages.

Fiberhome, "Discussion on CSI reporting," 3GPP TSG RAN WG1 #91, R1-1720866, Reno, USA Nov. 27-Dec. 1, 2017, 5 pages.

Huawei, HiSilicon, "Remaining issues on CSI acquisition," 3GPP TSG RAN WG1 #94, R1-1808143, Gothenburg, Sweden, Aug. 20-24, 2018, 19 pages.

Office Action issued in Japanese Application No. 2021-517463 on Jun. 14, 2022, 6 pages (with English translation).

EP Communicatins Pursuant to Article 94(3) EPC in Europe Appln. No. 19865264.6, mailed on Feb. 3, 2025, 11 pages.

* cited by examiner

CHANNEL STATE INFORMATION FEEDBACK METHOD, DEVICE, AND SYSTEM

CROSS-REFERENCE TO RELATED APPLICATIONS

This application is a continuation of International Application No. PCT/CN2019/106144, filed on Sep. 17, 2019, which claims priority to Chinese Patent Application No. 201811140024.1, filed on Sep. 28, 2018. The disclosures of the aforementioned applications are hereby incorporated by reference in their entireties.

TECHNICAL FIELD

This application relates to the field of communication technologies, and in particular, to a channel state information feedback method, a device, and a system.

BACKGROUND

A 5th generation wireless access system standard NR (new radio) is based on a MIMO (multiple-input multiple-output) technology. To improve downlink performance, that is, link performance from a base station to a terminal device, a closed-loop MIMO operation manner may be used. The base station transmits a CSI-RS (channel state information-reference signal), and triggers, by using downlink control information DCI, the terminal device to perform downlink channel measurement. After receiving downlink triggering signaling, the terminal device obtains downlink channel state information CSI (channel state information) by measuring the received CSI-RS signal, and reports the CSI on an uplink channel resource configured by the base station. The base station may determine, based on the CSI reported by the terminal device, a parameter used for transmitting data, thereby improving spectrum efficiency.

Due to limited uplink resources, the terminal device may need to discard a part of CSI information, and report CSI information with a high priority. Therefore, a priority of the CSI needs to be determined.

SUMMARY

This application provides a channel state information feedback method, a device, and a system, which can determine a priority of CSI.

This application provides the following technical solutions:

According to a first aspect, a channel state information feedback method is provided, and includes: A terminal device receives channel state information CSI reporting band indication information sent by a network device; the terminal device determines, based on the CSI reporting band indication information, subbands for CSI reporting in one bandwidth part BWP configured for the terminal device, where the subbands for CSI reporting are a subset of subbands in the BWP; and the terminal device sends CSI of M subbands with highest priorities in the subset to the network device, where $M \geq 1$; priorities of subbands in the subset are determined based on numbers of the subbands in the subset; and the numbers of the subbands in the subset are determined according to a preset rule, and the preset rule includes: The subbands in the subset are sequentially numbered; the subbands in the BWP are sequentially numbered; or subbands on a BWP-located carrier are sequentially numbered.

Optionally, the CSI of the M subbands includes: part 2 CSI of the M subbands; and the method further includes: The terminal device sends part 1 CSI of the subbands in the subset to the network device.

Optionally, the method further includes: The terminal device discards part 2 CSI of a subband other than the M subbands in the subset.

According to a second aspect, a channel state information feedback method is provided, and includes: A network device sends channel state information CSI reporting band indication information to a terminal device; the network device receives CSI that is of M subbands and that is sent by the terminal device, where the M subbands are M subbands with highest priorities in subbands for CSI reporting, and $M \geq 1$; and the subbands for CSI reporting are a subset of subbands in one bandwidth part BWP configured for the terminal device; and the network device obtains the CSI of the M subbands, where priorities of subbands in the subset are determined based on numbers of the subbands in the subset; and the numbers of the subbands in the subset are determined according to a preset rule, and the preset rule includes: The subbands in the subset are sequentially numbered; the subbands in the BWP are sequentially numbered; or subbands on a BWP-located carrier are sequentially numbered.

Optionally, the CSI of the M subbands includes: part 2 CSI of the M subbands; and the method further includes: The network device receives part 1 CSI that is of the subbands in the subset and that is sent by the terminal device.

According to a third aspect, a terminal device is provided, and includes a receiving unit, a processing unit, and a sending unit. The receiving unit is configured to receive channel state information CSI reporting band indication information sent by a network device; the processing unit is configured to determine, based on the CSI reporting band indication information, subbands for CSI reporting in one bandwidth part BWP configured for the terminal device, where the subbands for CSI reporting are a subset of subbands in the BWP; and the sending unit is configured to send CSI of M subbands with highest priorities in the subset to the network device, where $M \geq 1$; priorities of subbands in the subset are determined based on numbers of the subbands in the subset; and the numbers of the subbands in the subset are determined according to a preset rule, and the preset rule includes: The subbands in the subset are sequentially numbered; the subbands in the BWP are sequentially numbered; or subbands on a BWP-located carrier are sequentially numbered.

Optionally, the CSI of the M subbands includes: part 2 CSI of the M subbands; and the sending unit is further configured to send part 1 CSI of the subband in the subset to the network device.

Optionally, the processing unit is further configured to discard part 2 CSI of a subband in the subset other than the M subbands.

According to a fourth aspect, a network device is provided, and includes a sending unit, a processing unit, and a receiving unit. The sending unit is configured to send channel state information CSI reporting band indication information to a terminal device; the receiving unit is configured to receive CSI that is of M subbands and that is sent by the terminal device, where the M subbands are M subbands with highest priorities in subbands for CSI reporting, and M≥1; and the subbands for CSI reporting are a subset of subbands in one bandwidth part BWP configured for the terminal device; and the processing unit is configured to obtain the CSI of the M subbands, where priorities of subbands in the subset are determined based on numbers of the subbands in the subset; and the numbers of the subbands in the subset are determined according to a preset rule, and the preset rule includes: The subbands in the subset are sequentially numbered; the subbands in the BWP are sequentially numbered; or subbands on a BWP-located carrier are sequentially numbered.

Optionally, the CSI of the M subbands includes: part 2 CSI of the M subbands; and the receiving unit is further configured to receive part 1 CSI that is of the subbands in the subset and that is sent by the terminal device.

Optionally, a reference point for numbering the subbands in the subset includes: a subband where the first common resource block of the BWP-located carrier is located; the first subband in the BWP; or the first subband in the subset.

Optionally, the preset rule includes: A number of the subband where the first common resource block of the BWP-located carrier is located is 0, and the subbands on the carrier are sequentially numbered.

Optionally, the preset rule includes: The number of the subband where the first common resource block of the BWP-located carrier is located is 0, and the subbands in the BWP are sequentially numbered; a number of the first subband in the BWP is 0, and the subbands in the BWP are sequentially numbered; or a number of the first subband in the subset is 0, and the subbands in the BWP are sequentially numbered.

Optionally, the preset rule includes: The number of the subband where the first common resource block of the BWP-located carrier is located is 0, and subbands in the subset are sequentially numbered; a number of the first subband in a subband set of the BWP is 0, and subbands in the subset are sequentially numbered; or the number of the first subband in the subset is 0, and the subbands in the subset are sequentially numbered.

Optionally, the M subbands include all even numbered subbands in the subset.

According to a fifth aspect, this application provides a communications apparatus. The communications apparatus has functions of implementing the terminal device in any possible implementation of the first aspect. These functions may be implemented by hardware, or may be implemented by hardware by executing corresponding software. The hardware or software includes one or more units corresponding to these functions.

According to a sixth aspect, this application provides a communications apparatus. The communications apparatus has functions of implementing the network device in any possible implementation of the second aspect. These functions may be implemented by hardware, or may be implemented by hardware by executing corresponding software. The hardware or software includes one or more units corresponding to these functions.

According to a seventh aspect, this application provides a terminal device, including a transceiver, a processor, and a memory. The processor is configured to control the transceiver to receive and send a signal, the memory is configured to store a computer program, and the processor is configured to: invoke and run the computer program stored in the memory, so that the terminal device performs the method in any possible implementation of the first aspect.

According to an eighth aspect, this application provides a network device, including a transceiver, a processor, and a memory. The processor is configured to control the transceiver to receive and send a signal, the memory is configured to store a computer program, and the processor is configured to: invoke and run the computer program stored in the memory, so that the network device performs the method in any possible implementation of the second aspect.

According to a ninth aspect, this application provides a computer-readable storage medium. The computer-readable storage medium stores an instruction. When the instruction is run on a computer, the computer is enabled to perform the method in any possible implementation of the first aspect.

According to a tenth aspect, this application provides a computer-readable storage medium. The computer-readable storage medium stores an instruction. When the instruction is run on a computer, the computer is enabled to perform the method in any possible implementation of the second aspect.

According to an eleventh aspect, this application provides a chip, including a processor. The processor is configured to read and execute a computer program stored in a memory, to perform the method in any possible implementation of the first aspect. Optionally, the chip includes a memory, and the processor is connected to the memory by a circuit or a wire. Further optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

According to a twelfth aspect, this application provides a chip, including a processor. The processor is configured to read and execute a computer program stored in a memory, to perform the method in any possible implementation of the second aspect. Optionally, the chip includes a memory, and the processor is connected to the memory by a circuit or a wire. Further optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

Optionally, the memory and the processor may be units physically independent of each other, or the memory may be integrated with the processor.

According to a thirteenth aspect, this application provides a computer program product. The computer program product includes computer program code, and when the computer program code is run on a computer, the computer is enabled to perform the method in any possible implementation of the first aspect.

According to a fourteenth aspect, this application provides a computer program product. The computer program product includes computer program code, and when the computer program code is run on a computer, the computer is enabled to perform the method in any possible implementation of the second aspect.

In the solutions of embodiments of this application, the numbers of the subbands may be determined according to the preset rule, so that the terminal device can determine priorities of CSI on different subbands of the same report based on the numbers of the subbands. A problem that the numbers of the subbands cannot be determined because the reference points of the numbers of the subbands are not determined in a current protocol, and consequently, the terminal cannot determine the priorities of the CSI of the subbands is solved.

DESCRIPTION OF EMBODIMENTS

The following describes the embodiments of this application with reference to accompanying drawings.

Figure 1:
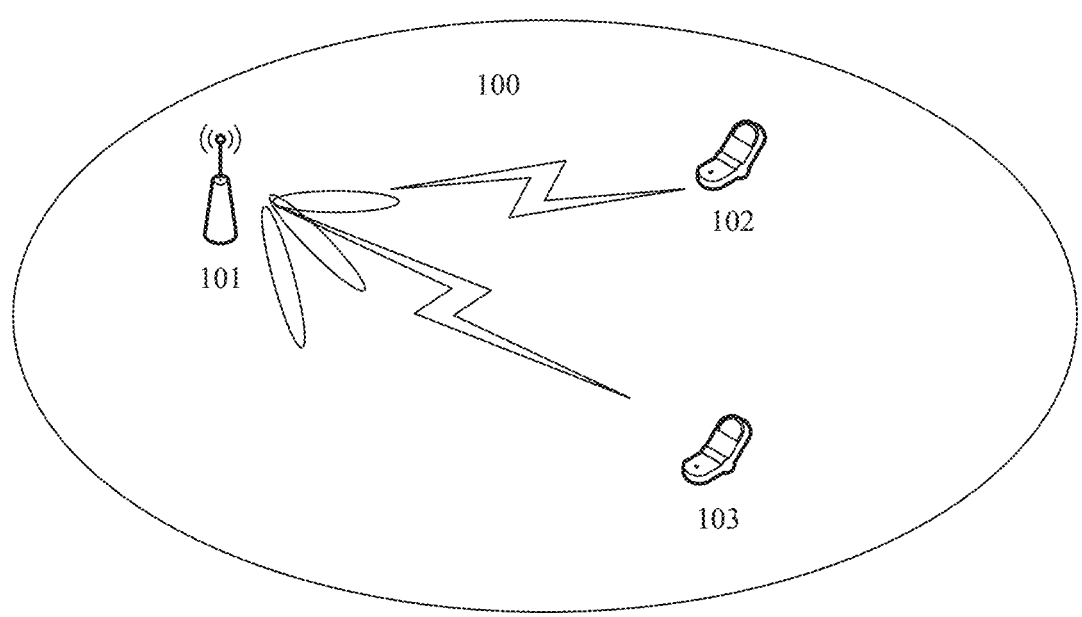
FIG. 1 is a schematic diagram of a communications system 100 applicable to an embodiment of this application.

FIG. 1 is a schematic diagram of a communications system 100 applicable to an embodiment of this application. As shown in FIG. 1, the wireless communications system 100 may include at least one network device 101. The network device 101 performs wireless communication with one or more terminal devices (for example, a terminal device 102 and a terminal device 103 shown in FIG. 1).

The wireless communications system 100 in this application includes, but is not limited to, a global system of mobile communication (GSM) system, a code division multiple access (CDMA) system, a wideband code division multiple access (WCDMA) system, a general packet radio service (GPRS), a Long Term Evolution (LTE) system, an LTE frequency division duplex (FDD) system, an LTE time division duplex (TDD), a universal mobile telecommunications system (UMTS), a worldwide interoperability for microwave access (WiMAX) communications system, and three major application scenarios of a next-generation mobile communications system (for example, 5G), that is, enhanced mobile broadband (eMBB), an ultra reliable low latency communication (ULLC), and an enhanced massive machine type communication (eMTC), or future new communications systems.

The terminal device in the embodiments of this application may also be user equipment (UE), a terminal, an access terminal, a subscriber unit, a subscriber station, a mobile station, a mobile console, a remote station, a remote terminal, a mobile device, a user terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, or a terminal device in a future evolved public land mobile communications network (PLMN).

The network device in the embodiments of this application may be a global system of mobile communication (GSM) system or a base transceiver station (BTS) in code division multiple access (CDMA), or may be a base station (NodeB, NB) in wideband code division multiple access (WCDMA), or may be an evolved base station (evolved Node B, eNB or e-NodeB) in an LTE system, or may be a radio controller in a cloud radio access network (CRAN) scenario. Alternatively, the network device may also be a relay station, an access point, a vehicle-mounted device, a wearable device, or the like of a future communications system (for example, 5G).

Figure 2:
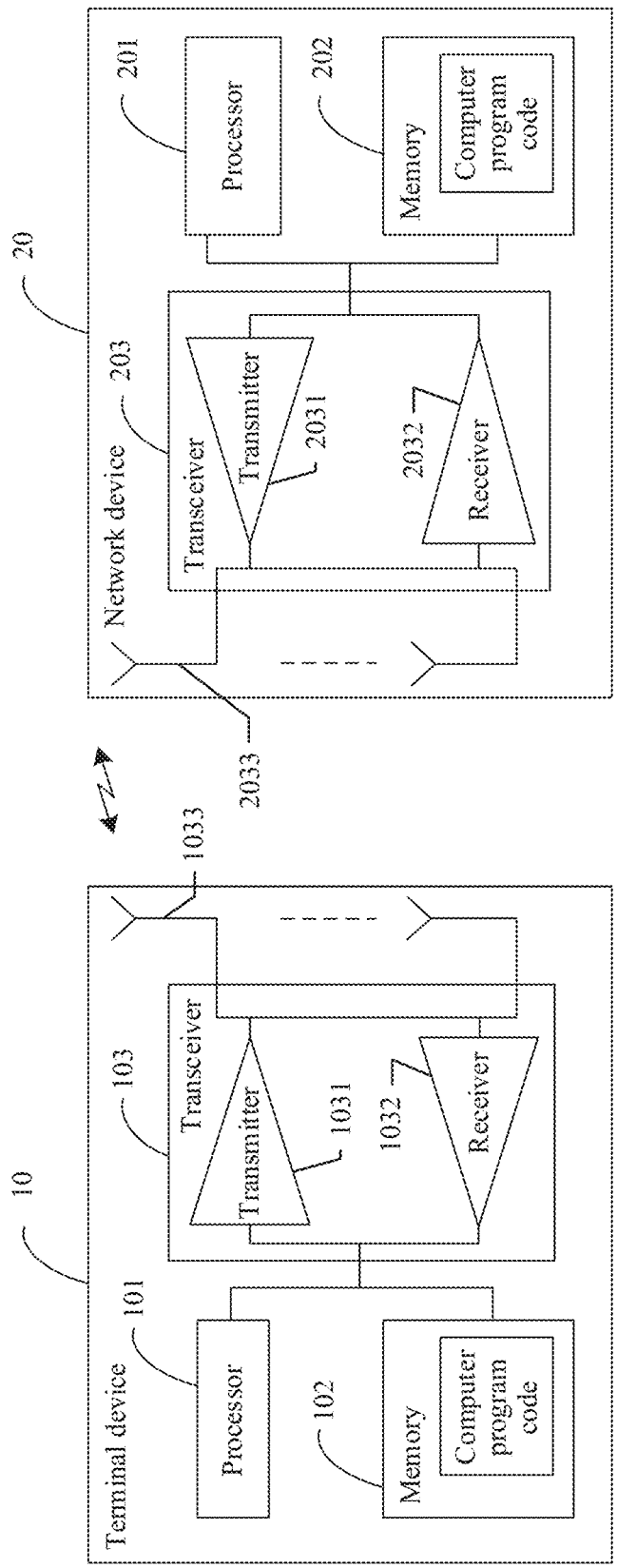
FIG. 2 is another schematic diagram of a communications system 100 applicable to an embodiment of this application.

The communications system shown in FIG. 1 may alternatively be represented in another form. As shown in FIG. 2, the communications system includes a terminal device 10 and a network device 20. The terminal device 10 includes a processor 101, a memory 102, and a transceiver 103, and the transceiver 103 includes a transmitter 1031, a receiver 1032, and an antenna 1033. The network device 20 includes a processor 201, a memory 202, and a transceiver 203. The transceiver 203 includes a transmitter 2031, a receiver 2032, and an antenna 2033.

A scenario to which this application is applicable is a scenario of CSI measurement and reporting. The CSI measurement and reporting includes: periodic CSI measurement and reporting, semi-persistent CSI measurement and reporting, or aperiodic CSI measurement and reporting.

When the terminal device is configured to perform semi-persistent CSI measurement and reporting, the terminal device starts CSI measurement and reporting only after receiving first downlink signaling sent by the network device, and the terminal device stops the CSI measurement and reporting after receiving second downlink signaling. The terminal device performs the periodic CSI measurement and reporting between moments of delivering the two downlink signaling.

An aperiodic CSI reporting and measurement process is as follows: the network device first semi-statically configures N CSI reporting (CSI reporting) configurations parameters for the terminal by using radio resource control (RRC) signaling, where N≥1. One or more pieces of CSI reporting is triggered by using downlink control information (DCI), and UE performs CSI measurement based on configurations parameters of the triggered CSI reporting, and reports a CSI measurement result by using a physical uplink shared channel (PUSCH). Similar to the semi-persistent CSI measurement and reporting, the aperiodic CSI measurement and reporting needs to be triggered by a base station. However, the aperiodic CSI measurement and reporting does not need to be deactivated after the DCI is triggered, and only needs to be measured and reported once.

For ease of understanding the embodiments of this application, several basic concepts are first described.

(1) Bandwidth Part (BWP)

The network device may configure one or more BWPs for the terminal device on one carrier by using CSI resource settings information. In a current standard, a maximum of four BWPs may be configured on one carrier for one terminal device. Each BWP includes a group of consecutive common resource blocks (CRBs). The first CRB on the carrier is represented as CRB0, that is, a start number of the CRB on the carrier is 0. The start number of the CRB on the carrier may alternatively be 1. The case is similar, and details are not repeated herein. The following uses the start number 0 as an example for description.

The network device configures one or more groups of CSI reporting configurations parameters for the terminal device by using RRC. Each BWP corresponds to one group of CSI reporting configurations parameters. Each group of CSI reporting configurations parameters includes: subband size information.

A CRB0 is used as a reference point, and the BWP may be divided into a plurality of subbands based on a subband size. Each subband includes a group of consecutive physical resource blocks (PRBs). In frequency domain, each PRB includes 12 consecutive subcarriers. A point A is used as a common reference point for PRB division. The point A is configured by the network device for the terminal device. A subcarrier 0 in the CRB0 corresponds to the point A in a middle point of the frequency domain.

(II) CSI Reporting Band Indication Information

The group of CSI reporting configurations parameters configured by the network device for the terminal device may further include: the CSI reporting band indication information. The CSI reporting band indication information is used to indicate a frequency domain range of the terminal device to measure and report CSI. The CSI reporting band indication information may be a group of bitmaps formed by 0 and 1, and is used to indicate a group of subbands. The terminal device performs the CSI measurement and reporting in a frequency domain range corresponding to the group of subbands.

The terminal device determines, based on the CSI reporting band indication information, subbands for CSI reporting in one BWP configured for the terminal device. The subbands for CSI reporting are a subset of subbands in the BWP.

Figure 3:
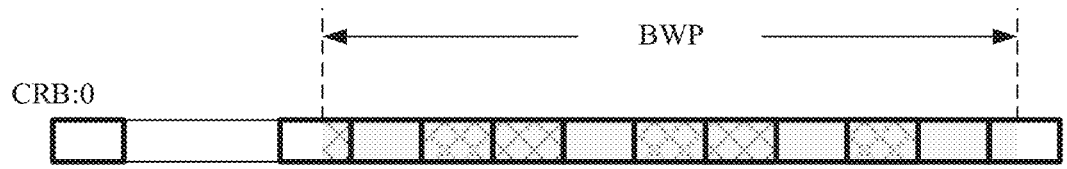
FIG. 3 is a schematic diagram of a relationship among a BWP, a CSI reporting band, and a subband.

FIG. 3 is a schematic diagram of a relationship among a BWP, a CSI reporting band, and a subband. In FIG. 3, a gray area is a range of a BWP in frequency domain; while an area with grids in the BWP is a subband on which the CSI measurement and reporting needs to be performed and that is indicated by the CSI reporting band indication information. A reference point for subband division in the BWP is not a start location of the BWP, but is CRB0. A size of the first subband and a size of the last subband in the BWP may be the same as or different from another subband in the BWP. As shown in FIG. 3, a size of a subband in the BWP other than the first subband and the last subband is the same, and is equal to a subband size configured by the network device. Therefore, the size of the first subband and the size of the last subband in the BWP are not equal to the subband size configured by the network device. For example, the size of the first subband in the BWP is $N_{PRB}^{SB}-(N_{BWP,i}^{start} \mod N_{PRB}^{SB})$ and the size of the last subband in the BWP is $(N_{BWP,i}^{start} \mod N_{PWB,i}^{size}) \mod N_{PRB}^{SB}$, where $N_{PRB}^{SB}$ is the subband size configured by the network device, that is, a quantity of PRBs included in each subband, $N_{BWP,i}^{start}$ represents the start location of the BWP, and $N_{BWP,i}^{size}$ represents a size of the BWP.

(III) CSI

The CSI of the subband may include: part 1 CSI of the subband and part 2 CSI of the subband.

When the terminal device reports the CSI by using a physical uplink shared channel (PUSCH), for a first type Type I codebook, the part 1 CSI includes a channel quality indicator (CQI) of a first codeword. It is possible that the part 1 CSI may further include a rank indication (RI) or a CSI-RS resource indicator (CRT). For a second type Type II codebook the part 1 CSI includes an RI, a CQI, and indication information of a quantity of non-zero wideband amplitude coefficients on each layer. For the Type I codebook, the part 2 CSI includes a precoding matrix indication (PMI), and when the RI is greater than four, the part 2 CSI further includes a CQI of a second codeword. For the Type II codebook, the part 2 CSI includes a Type II PMI.

When the terminal device reports the CSI by using a physical uplink control channel (PUCCH) resource, information included in the part 1 CSI is the same as that in the part 1 CSI reported by using the PUSCH. For the Type II codebook, the part 2 CSI includes a precoding matrix indication (PMI), and when the RI is greater than four, the part 2 CSI further includes the CQI of the second codeword. The part 2 CSI does not include the Type II PMI.

The network device may simultaneously trigger the terminal device to report $N_{Rep}$ pieces of CSI, where $N_{Rep} \geq 1$. The CSI of the subbands has different priorities. For example, a priority of the part 1 CSI is higher than a priority of the part 2 CSI. Priorities of parts 2 of different subbands may also be different, as shown in Table 1.

TABLE 1

| Priority of Part 2 CSI |
| --- |
| Priority 0: |
| Part 2 wideband CSI for CSI reports (reports) 1 to $N_{Rep}$ |
| Priority 1: |
| Part 2 subband (subband) CSI of even subbands (even subbands) for CSI report 1 |
| Priority 2: |
| Part 2 subband CSI of odd subbands (odd subbands) for CSI report 1 |
| Priority 3: |
| Part 2 subband CSI of even subbands for CSI report 2 |
| Priority 4: |
| Part 2 subband CSI of odd subbands for CSI report 2 |
| ... |

TABLE 1-continued

Priority of Part 2 CSI

Priority $2N_{Rep}-1$:
Part 2 subband CSI of even subbands for CSI report $N_{Rep}$
Priority $2N_{Rep}$:
Part 2 subband CSI of odd subbands for CSI report $N_{Rep}$ $N_{Rep}$ is a quantity of CSI reports to be reported. The priority is numbered as 0, 1, . . . , and $2N_{Rep}$. A smaller priority number indicates a higher priority. For example, Part 2 wideband CSI of $N_{Rep}$ CSI reports has a highest priority, and then based on numbers of the CSI reports, a smaller number indicates a higher priority of the part 2 subband CSI. In the same report, a priority of part 2 subband CSI on a subband with an even subband number is higher than a priority of part 2 subband CSI on a subband with an odd subband number. When the CSI is reported, and if a part of the CSI needs to be discarded, the terminal device reports the CSI with a higher priority based on the priorities. The terminal device may discard a part of CSI with a relatively low priority. The number of the subband is related to determining of the priority of the CSI. In other words, the priority of the subband needs to be determined based on the number of the subband in the subset.

(IV) Number of Subband

The number of the subband may be determined according to a preset rule. The preset rule may limit a numbering range. For example, the preset rule includes any one of the following:

(1) Subbands on a BWP-located carrier are sequentially numbered.

That is, all the subbands on the BWP-located carrier are sequentially numbered.

(2) Subbands in the BWP are sequentially numbered.

That is, all the subbands in the BWP are sequentially numbered.

(3) Subbands in a subset are sequentially numbered.

The subset refers to: a subset including subbands for CSI reporting in one BWP configured for the terminal device. That is, the subbands for CSI reporting in the BWP are a subset of subbands in one bandwidth part BWP configured for the terminal device.

That is, the subbands in the subset of the subbands for CSI reporting in one BWP are sequentially numbered.

The preset rule may further limit a reference point for numbering. For example, a reference point for numbering subbands includes: a subband where the first common resource block CRB0 of a BWP-located carrier is located; the first subband in the BWP; or the first subband in the subset.

Based on different reference points for numbering and numbering ranges, preset rules for subband numbering are summarized as the following seven rules.

Rule 1: A number of the subband where the first common resource block CRB0 of the BWP-located carrier is located is 0, and subbands on the carrier are sequentially numbered.

Figure 4:
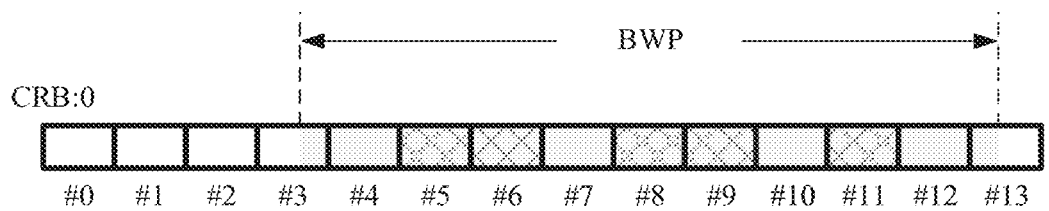
FIG. 4 is a first schematic diagram of numbers of subbands.

For example, as shown in FIG. 4, the number of the subband where the CRB0 of the BWP-located carrier is located is subband #0, and all the subbands on the same carrier are sequentially numbered.

Rule 2: The number of the subband where the first common resource block of the BWP-located carrier is located is 0, and subbands in the BWP are sequentially numbered.

Figure 5:
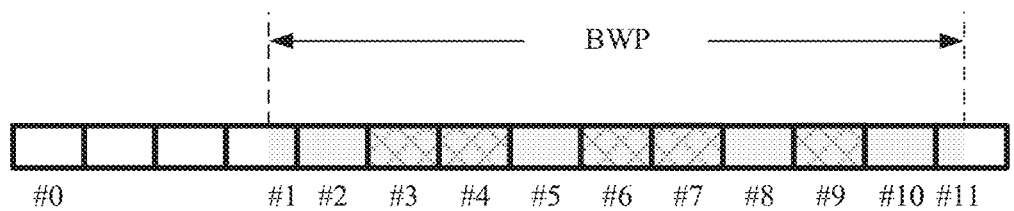
FIG. 5 is a second schematic diagram of numbers of subbands.

For example, as shown in FIG. 5, the number of the subband where the CRB0 of the BWP-located carrier is located is subband #0, all the subbands in the BWP are sequentially numbered.

Rule 3: A number of the first subband in the BWP is 0, and subbands in the BWP are sequentially numbered.

Figure 6:
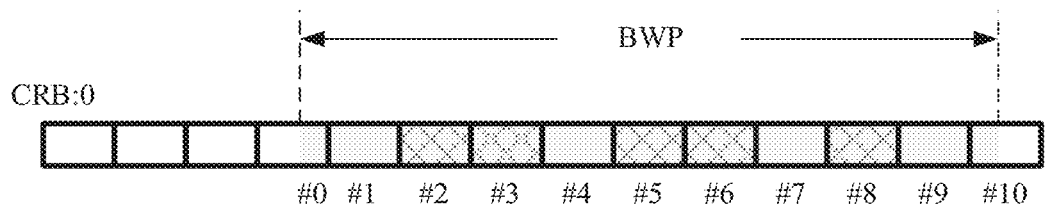
FIG. 6 is a third schematic diagram of numbers of subbands.

For example, as shown in FIG. 6, the number of the first subband in the BWP is #0, all the subbands in the BWP are sequentially numbered.

Rule 4: A number of the first subband in the subset is 0, and subbands in the BWP are sequentially numbered.

Figure 7:
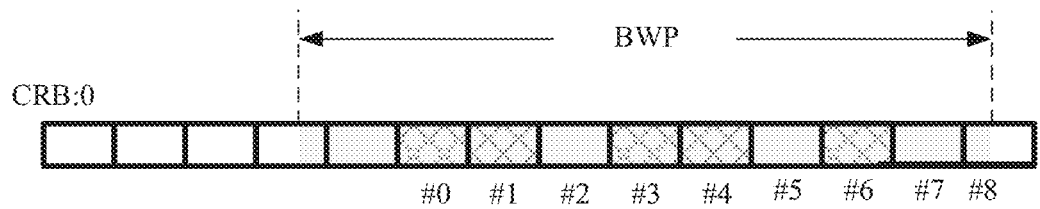
FIG. 7 is a fourth schematic diagram of numbers of subbands.

For example, as shown in FIG. 7, the number of the first subband in the subset is #0, and the subbands after the subband #0 in the BWP are sequentially numbered.

Rule 5: The number of the subband where the first common resource block of the BWP-located carrier is located is 0, and subbands in the subset are sequentially numbered.

Figure 8:
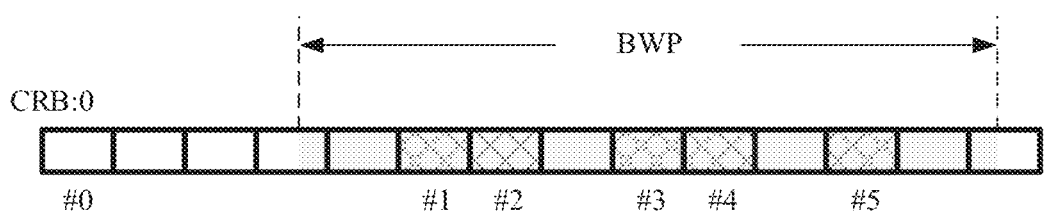
FIG. 8 is a fifth schematic diagram of numbers of subbands.

For example, as shown in FIG. 8, the number of the subband where the CRB0 of the BWP-located carrier is located is subband #0, and the subbands in the subset are sequentially numbered.

Rule 6: A number of the first subband in a subband set of the BWP is 0, and subbands in the subset are sequentially numbered.

Figure 9:
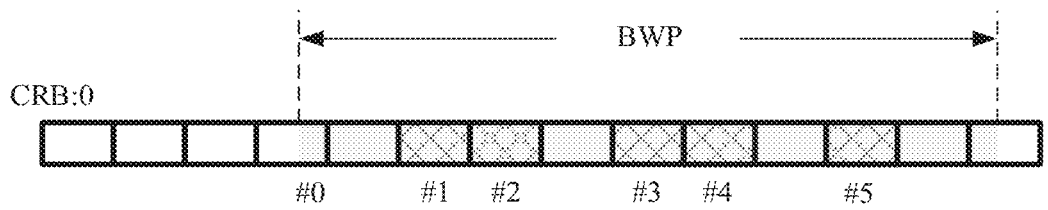
FIG. 9 is a sixth schematic diagram of numbers of subbands.

For example, as shown in FIG. 9, the number of the first subband in the BWP is #0, and the subbands in the subset are sequentially numbered.

Rule 7: The number of the first subband in the subset is 0, and the subbands in the subset are sequentially numbered.

Figure 10:
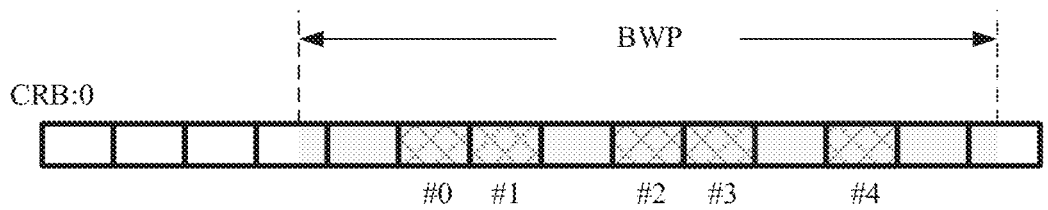
FIG. 10 is a seventh schematic diagram of numbers of subbands.

For example, as shown in FIG. 10, the number of the first subband in the subset is #0, and the subbands in the subset are sequentially numbered.

Based on the concepts described above, the following describes a channel state information feedback method according to an embodiment of this application.

Compared with the conventional technology, an embodiment of this application provides a channel state information feedback method 1100, which can accurately determine a number of a subband, so that a terminal device determines a priority of CSI of the subband based on the number of the subband. The method 1100 is described below.

In the method 1100, a network device sends CSI reporting band indication information to a terminal device, and the terminal device determines, based on the received CSI reporting band indication information, subbands for CSI reporting in one BWP configured for the terminal device, where the subbands for CSI reporting are a subset of subbands in the BWP. The terminal device determines a number of the subband in the subset according to the foregoing preset rule. A priority of the subband in the subset is determined based on the determined number of the subband in the subset. The terminal device sends CSI of M subbands with highest priorities in the subset to the network device, where M≥1. The network device obtains the CSI of the M subbands.

Figure 11:
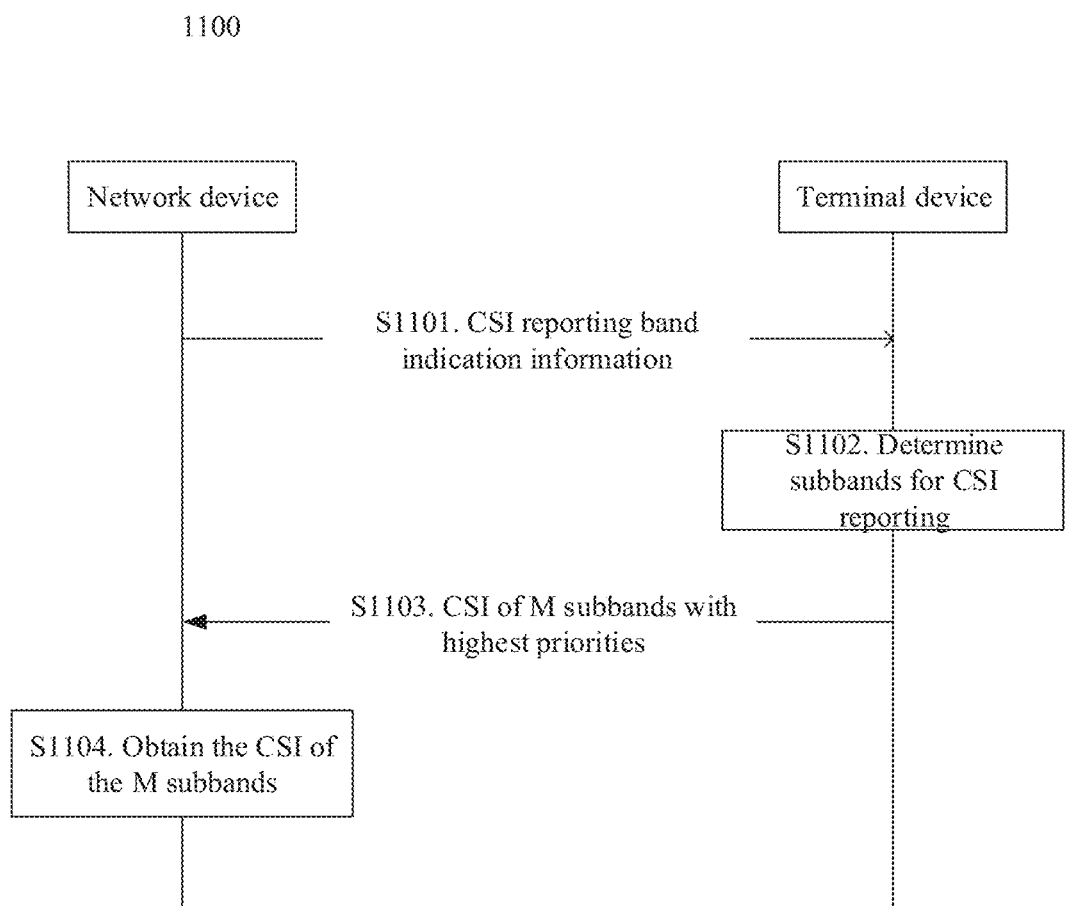
FIG. 11 is a schematic flowchart of a channel state information feedback method 1100 according to an embodiment of this application.

FIG. 11 is a schematic flowchart of a channel state information feedback method 1100 according to an embodiment of this application.

S1101. A network device sends CSI reporting band indication information to a terminal device, and the terminal device receives the CSI reporting band indication information sent by the terminal device.

The network device configures one or more groups of CSI reporting configurations parameters for the terminal device by using RRC. The CSI reporting configurations parameters include the CSI reporting band indication information. For a specific description of the CSI reporting band indication information, refer to the foregoing description.

Optionally, the CSI reporting configurations parameters may further include subband size information.

The network device may further configure one or more groups of CSI reporting configurations parameters for the terminal device by using the RRC. The CSI reporting configurations parameters include one or more BWPs configured by the network device on one carrier for the terminal device. Each BWP corresponds to one group of CSI reporting configurations parameters.

S1102. The terminal device determines, based on the received CSI reporting band indication information, subbands for CSI reporting in one BWP configured for the terminal device. The subbands for CSI reporting are a subset of subbands in the BWP.

The terminal device determines a subband size based on the received subband size information. The terminal device divides the BWP into a plurality of subbands based on the subband size.

The network device may trigger CSI reporting by using DCI, and the terminal device performs CSI measurement based on configuration information of the triggered CSI reporting. The terminal device determines the subset based on CSI reporting band indication information in the configuration information of the triggered CSI reporting.

The terminal device determines a number of a subband in the subset according to a preset rule of the subband. The preset rule includes a numbering range of the subband. The numbering range of the subband includes: The subbands in the subset are sequentially numbered; the subbands in the BWP are sequentially numbered; or subbands on a BWP-located carrier are sequentially numbered.

Optionally, the preset rule may further limit a reference point for numbering the subbands in the subset. The reference point for numbering the subbands in the subset includes: a subband where the first common resource block of a BWP-located carrier is located; the first subband in the BWP; or the first subband in the subset.

The preset rule may limit both the numbering range of the subband and the reference point for numbering the subbands. The preset rule may include any one of the foregoing rules 1 to 7.

The terminal device measures the subbands in the subset, and obtains a measurement result. In other words, the terminal device obtains CSI of the subbands in the subset. The terminal device determines CSI of M subbands with highest priorities in the subset based on the number of the subband in the subset and priority information of the CSI. Optionally, the M subbands include all even numbered subbands in the subset.

S1103. The terminal device sends CSI of M subbands to the network device, and the network device receives the CSI of the M subbands.

The terminal device may send the CSI of the M subbands to the network device by using a PUCCH or a PUSCH. The CSI of the M subbands includes part 2 CSI of the M subbands. The part 2 CSI of the M subbands includes: part 2 narrowband CSI of the M subbands and part 2 wideband CSI of the subbands in the subset. The terminal device may discard part 2 CSI of a subband in the subset other than the M subbands.

The method further includes: The terminal device sends part 1 CSI of the subbands in the subset to the network device.

S1104. The network device obtains the CSI of the M subbands.

A network side receives a CSI report sent by the terminal device, where the CSI report carries the CSI of the M subbands. The network device may determine, in the same method as that of the terminal device, a number of a subband that is in the band range and that is indicated in the CSI reporting band indication information.

For example, if subband CSI of a Part 2 CSI report is not discarded, the network device may obtain CSI of all the subbands that are within the measurement reporting band and that are indicated by the CSI reporting band indication information. If a part of the subband CSI of the Part 2 CSI report is discarded, the network device may obtain CSI on even subbands that are within the measurement reporting band and that are indicated by the CSI reporting band indication information.

In the solution of this embodiment of this application, numbers of subbands may be determined according to a preset rule, so that the terminal device can determine priorities of CSI on different subbands of the same report based on the numbers of the subbands. A problem that numbers of subbands cannot be determined because reference points of the numbers of the subbands are not determined in a current protocol, and consequently the terminal cannot determine priorities of CSI of the subbands is solved.

The following describes a communications apparatus provided in this application.

Figure 12:
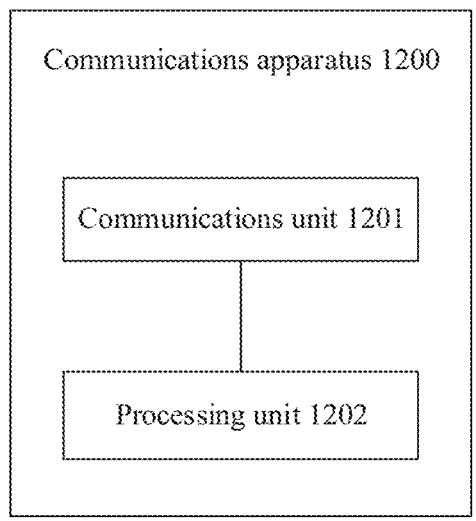
FIG. 12 is a schematic structural block diagram of a communications apparatus 1200 according to an embodiment of this application.

FIG. 12 is a schematic structural block diagram of a communications apparatus 1200 according to an embodiment of this application. As shown in FIG. 12, the apparatus 1200 includes a communications unit 1201 and a processing unit 1202.

Optionally, the communications apparatus 1200 may correspond to the terminal device in the CSI feedback method provided in this application. Each unit included in the communications apparatus 1200 is configured to implement corresponding operations and/or procedures in the CSI feedback method and the embodiments thereof.

Specifically, the communications unit 1201 and the processing unit 1202 are separately configured to perform the following operations.

The communications unit 1201 is configured to support the terminal device in performing the steps of sending and/or receiving by the terminal device in the embodiment.

The processing unit 1202 is configured to support the terminal device in performing the steps of determining by the terminal device in the embodiments, as well as other functions excluding functions of a sending unit and a receiving unit, and the like.

Optionally, the communications apparatus 1200 may alternatively be a chip or an integrated circuit installed in the terminal device.

Optionally, the communications unit 1201 may include a sending unit and a receiving unit. The sending unit is configured to support the terminal device in performing the steps of sending by the terminal device in the embodiment. The receiving unit is configured to support the terminal device in performing the steps of receiving information by the terminal device in the embodiment.

Optionally, the communications unit 1201 may alternatively be configured as a transceiver, and the processing unit 1202 may be a processor. The transceiver may include a transmitter and a receiver to jointly implement a transceiver function. Alternatively, the communications unit 1201 may alternatively be an input/input interface or an input/output circuit.

Figure 13:
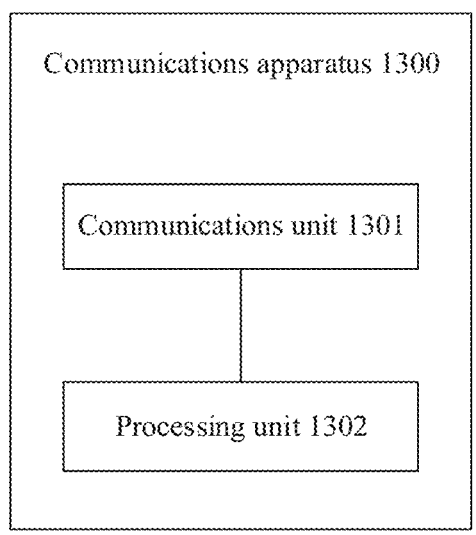
FIG. 13 is a schematic structural block diagram of a communications apparatus 1300 according to an embodiment of this application.

FIG. 13 is a schematic structural block diagram of a communications apparatus 1300 according to an embodiment of this application. As shown in FIG. 13, the communications apparatus 1300 includes a processing unit 1302 and a communications unit 1301.

Optionally, the communications apparatus 1300 may correspond to the network device in the CSI feedback method and the embodiments thereof provided in this application, or may be a chip or an integrated circuit installed in the network device.

Specifically, the communications unit 1301 and the processing unit 1302 are separately configured to perform the following operations.

The communications unit 1301 is configured to support the network device in performing the steps of sending and/or receiving by the network device in the embodiment.

The processing unit 1302 is configured to support the network device in performing the steps of determining by the network device in the embodiments, as well as other functions excluding functions of a sending unit and a receiving unit, and the like.

Optionally, the communications unit 1301 may include a sending unit and a receiving unit. The sending unit is configured to support the network device in performing the steps of sending by the network device in the embodiment. The receiving unit is configured to support the network device in performing the steps of receiving information by the network device in the embodiment.

Optionally, the communications unit 1301 may alternatively be configured as a transceiver, and the processing unit 1302 may be a processor. The transceiver may include a transmitter and a receiver to jointly implement a transceiver function. Alternatively, the communications unit 1301 may be an input/output interface or an input/output circuit.

The network devices and the terminal devices in the foregoing apparatus embodiments correspond to the network devices and the terminal devices in the method embodiments, and corresponding units perform corresponding steps of the method. For example, the communications unit performs the steps of sending and receiving in the method embodiments, and other steps except sending and receiving may be performed by the processing unit. The communications unit may also be referred to as a transceiver unit. The transceiver unit includes a sending unit and a receiving unit, and has both sending and receiving functions.

Figure 14:
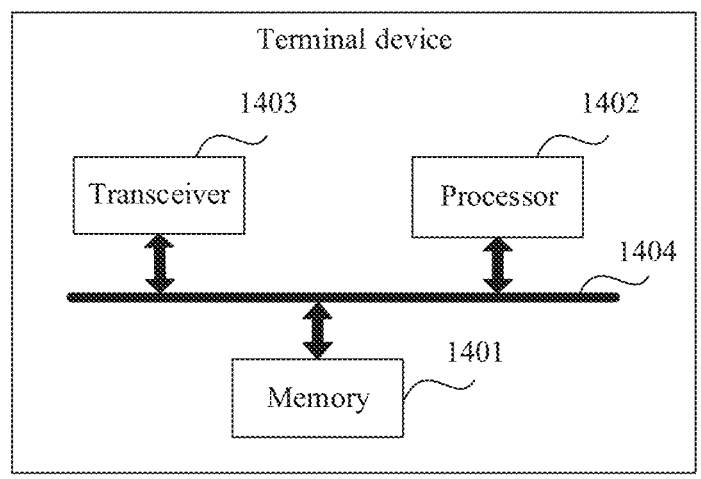
FIG. 14 is a schematic structural diagram of a terminal device according to an embodiment of this application.

FIG. 14 is a schematic structural block diagram of a terminal device according to an embodiment of this application. As shown in FIG. 14, the terminal device includes: one or more processors 1402, one or more memories 1401, and one or more transceivers 1403. The processor 1402 is configured to control the transceiver 1403 to receive and send a signal, the memory 1401 is configured to store a computer program, and the processor 1402 is configured to: invoke and run the computer program from the memory 1401, to perform the CSI feedback method provided in this application and corresponding procedures and/or operations performed by the terminal device in the embodiments. For the sake of brevity, details are not described herein again.

For example, the terminal device may be the terminal device 102 or 103 in the wireless communications system shown in FIG. 1. For example, the processor 1402 may correspond to the processing unit 1202 in FIG. 12, and the transceiver 1403 may correspond to the communications unit 1201 shown in FIG. 12.

Figure 15:
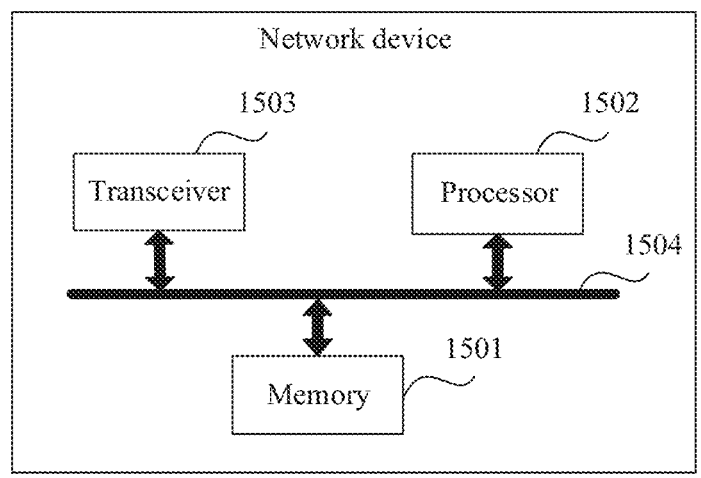
FIG. 15 is a schematic structural diagram of a network device according to an embodiment of this application.

FIG. 15 is a schematic structural block diagram of a network device according to an embodiment of this application. As shown in FIG. 15, the network device may be applied to the wireless communications system shown in FIG. 1, to perform functions of the network device in the CSI feedback method provided in this application.

As shown in FIG. 15, the network device includes: one or more processors 1502, one or more memories 1501, and one or more transceivers 1503. The processor 1502 is configured to control the transceiver 1503 to receive and send a signal, the memory 1501 is configured to store a computer program, and the processor 1502 is configured to: invoke and run the computer program from the memory 1501, to perform the CSI feedback method provided in this application and corresponding procedures and/or operations performed by the terminal device in the embodiments. For the sake of brevity, details are not described herein again.

Moreover, this application provides a computer-readable storage medium. The computer-readable storage medium stores an instruction. When run on a computer, the instruction enables the computer to perform corresponding operations and/or procedures performed by the terminal device in the CSI feedback method in the embodiments of this application.

This application further provides a computer program product. The computer program product includes computer program code, and when run on a computer, the computer program code enables the computer to perform corresponding operations and/or procedures performed by the terminal device in the CSI feedback method in the embodiments of this application.

This application further provides a chip, including a processor. The processor is configured to: invoke and run a computer program stored in a memory, to perform corresponding operations and/or procedures performed by the terminal device in the CSI feedback method in the embodiments of this application. Optionally, the chip further includes a memory, the processor is connected to the memory by using a circuit or a wire, and the processor is configured to read and execute a computer program in the memory. Further optionally, the chip further includes a communications interface, and the processor is connected to the communications interface. The communications interface is configured to receive data and/or information that needs to be processed. The processor obtains the data and/or information from the communications interface, and processes the data and/or information. The communications interface may be an input/output interface.

This application provides a computer-readable storage medium. The computer-readable storage medium stores a computer instruction. When run on a computer, the computer instruction enables the computer to perform corresponding operations and/or procedures performed by the network device in the CSI feedback method in the embodiments of this application.

This application further provides a computer program product. The computer program product includes computer program code, and when run on a computer, the computer program code enables the computer to perform corresponding operations and/or procedures performed by the network device in the CSI feedback method in the embodiments of this application.

This application further provides a chip, including a processor. The processor is configured to: invoke and run a computer program stored in a memory, to perform corresponding operations and/or procedures performed by the network device in the CSI feedback method in the embodiments of this application. Optionally, the chip further includes a memory, the processor is connected to the memory by using a circuit or a wire, and the processor is configured to read and execute a computer program in the memory. Further optionally, the chip further includes a communications interface, and the processor is connected to the communications interface. The communications interface is configured to receive data and/or information that needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, a digital-to-analog converter, or the like. The processor may allocate control and signal processing functions of the terminal device or the network device between the devices based on respective functions of the devices. In addition, the processor may have a function of operating one or more software programs, and the software program may be stored in a memory. The functions of the processor may be implemented by hardware, or may be implemented by hardware executing corresponding software. The hardware or software includes one or more modules corresponding to the above functions.

The memory may be a read-only memory (ROM), another type of static storage device that can store static information and instructions, a random access memory (RAM), or another type of dynamic storage device that can store information and instructions, or may be an electrically erasable programmable read-only memory (EEPROM) or a compact disc read-only memory (CD-ROM) or another compact disc storage, optical disc storage (including compressed optical discs, laser discs, optical discs, digital versatile optical discs, and Blu-ray discs), magnetic disk storage media, or another magnetic storage device, or may be any another medium that can be used to carry or store desired program code in the form of an instruction or a data structure and that can be accessed by a computer.

Optionally, the memory and the processor in the foregoing embodiments may be units that are physically independent of each other, or the memory may also be integrated with the processor.

In the embodiments of this application, "at least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one of the following" and similar expressions refer to any combination of these terms, including any combination of a singular or plural term. For example, at least one of a, b, and c may represent: a, b, c, a-b, a-c, b-c, or a-b-c, where a, b, and c may be singular or plural.

A person of ordinary skill in the art may be aware that, units and algorithm steps described in the embodiments disclosed in this specification may be implemented by electronic hardware or a combination of computer software and the electronic hardware. Whether the functions are performed in a hardware or software manner depends on particular applications and design constraint conditions of the technical solutions. A person skilled in the art may use different methods to implement the described functions for each particular application, but it should not be considered that the implementation exceeds the scope of this application.

It may be clearly understood by a person skilled in the art that, for convenient and brief description, for a detailed working process of the foregoing described system, apparatus, and unit, refer to a corresponding process in the foregoing method embodiments, and details are not described herein again.

In the several embodiments provided in this application, the disclosed system, apparatus, and method may be implemented in other manners. For example, the described apparatus embodiments are merely examples. For example, unit division is merely logical function division and may be another division during actual implementation. For example, a plurality of units or components may be combined, or integrated into another system, or some features may be omitted or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units as separate parts may not be physically separate, and parts displayed as units may not be physical units, may be located in one position, or may be distributed on a plurality of network units. Some or all of the units may be selected based on actual requirements to implement objectives of the technical solutions of this application.

In addition, functional units in the embodiments of this application may be integrated into one processing unit, or each of the units may exist independently physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods according to the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a first communication apparatus, the method comprising:
receiving from a network device, indication information of a channel state information (CSI) reporting band, wherein the indication information indicates a subset of subbands in a bandwidth part (BWP) configured for CSI reporting;
determining based on the indication information and preset rules, CSI reporting priorities of the subset of the subbands, wherein the preset rules include numbering the subset of the subbands with corresponding index numbers arranged in an ascending numerical order and numbering a first subband in the subset of the subbands with index number 0;
determining based on the CSI reporting priorities, M subbands with higher CSI reporting priorities in the subset of the subbands compared to a remainder of subbands in the subset of subbands, wherein M is a positive integer; and
sending to the network device, CSI of the M subbands.

2. The communication method according to claim 1, wherein the CSI of the M subbands comprises part 2 CSI of the M subbands, and the method further comprises:
sending part 1 CSI of the subset of the subbands to the network device.

3. The communication method according to claim 2, further comprising:
removing part 2 CSI of subbands in the subset of the subbands other than the M subbands.

4. The method according to claim 1, wherein each of the M subbands has an even index number.

5. A communication apparatus, comprising at least one processor;
configured with processor-executable instructions to perform operations comprising:
receiving, from a network device, indication information of a channel state information (CSI) reporting band, wherein the indication information indicates a subset of subbands in a bandwidth part (BWP) configured for CSI reporting;
determining, based on the indication information and preset rules, CSI reporting priorities of the subset of the subbands, wherein the preset rules include numbering the subset of the subbands with corresponding index numbers arranged in an ascending numerical order and numbering a first subband in the subset of the subbands with index number 0;
determining, based on the CSI reporting priorities, M subbands with higher CSI reporting priorities in the subset of the subbands compared to a remainder of subbands in the subset of subbands, wherein M is a positive integer; and
sending, to the network device, CSI of M subbands.

6. The communication apparatus according to claim 5, wherein the CSI of the M subbands comprises part 2 CSI of the M subbands, and the operations further comprising:
sending part 1 CSI of the subset of the subbands to a network device.

7. The communication apparatus according to claim 6, wherein the operations further comprising:
removing part 2 CSI of subbands in the subset of the subbands other than the M subbands.

8. The terminal device according to claim 5, wherein each of the M subbands has an even index number.

9. A communication apparatus, comprising:
at least one processor configured with processor-executable instructions to perform operations comprising:
sending indication information of a channel state information (CSI) reporting band to a terminal device, wherein the indication information indicates a subset of subbands in a bandwidth part (BWP) configured for the terminal device for CSI reporting;
receiving CSI of M subbands from the terminal device, wherein the M subbands are comprised in the subset of subbands in the bandwidth part (BWP), and wherein the M subbands have higher CSI reporting priorities in a subset of the subbands for CSI reporting compared to a remainder of subbands in the subset of the subbands, wherein M is a positive integer, and wherein each of the M subbands has an even index number; and
identifying the CSI of the M subbands, wherein CSI reporting priorities of the subset of the subbands for CSI reporting are determined by the terminal device based on preset rules, wherein the preset rules include numbering the subset of the subbands with corresponding index numbers arranged in an ascending numerical order and numbering a first subband in the subset of the subbands with index number 0.

10. The communication apparatus according to claim 9, wherein the CSI of the M subbands comprises part 2 CSI of the M subbands, and the operations further comprising:
receiving part 1 CSI of the subset of the subbands from the terminal device.

11. A non-transitory computer-readable storage medium storing computer instructions, that when executed by at least one processor, cause the at least one processor to perform operations comprising:
receiving from a network device, indication information of a channel state information (CSI) reporting band, wherein the indication information indicates a subset of subbands in a bandwidth part (BWP) configured for CSI reporting;
determining based on the indication information and preset rules, CSI reporting priorities of the subset of the subbands, wherein the preset rules include numbering the subset of the subbands with corresponding index numbers arranged in an ascending numerical order and numbering a first subband in the subset of the subbands with index number 0;
determining based on the CSI reporting priorities, M subbands with higher CSI reporting priorities in the subset of the subbands compared to a remainder of subbands in the subset of subbands, wherein M is a positive integer; and
sending to the network device, CSI of the M subbands.

12. The non-transitory computer-readable storage medium according to claim 11, wherein the CSI of the M subbands comprises part 2 CSI of the M subbands, and the method further comprises:
sending part 1 CSI of the subset of the subbands to the network device.

13. The non-transitory computer-readable storage medium according to claim 12, further comprising:
removing part 2 CSI of subbands in the subset of the subbands other than the M subbands.

14. The non-transitory computer-readable storage medium according to claim 11, wherein each of the M subbands has an even index number.

* * * * *

UNITED STATES PATENT AND TRADEMARK OFFICE
CERTIFICATE OF CORRECTION

| | | |
|---|---|---|
| PATENT NO. | : 12,261,662 B2 | Page 1 of 1 |
| APPLICATION NO. | : 17/213404 | |
| DATED | : March 25, 2025 | |
| INVENTOR(S) | : Yongping Zhang et al. | |

It is certified that error appears in the above-identified patent and that said Letters Patent is hereby corrected as shown below:

In the Claims

In Column 17, In Line 38, In Claim 5, delete "processor;" and insert -- processor --.

In Column 18, In Line 1, In Claim 8, delete "terminal device" and insert -- communication apparatus --.

Signed and Sealed this
Fourth Day of November, 2025

John A. Squires
*Director of the United States Patent and Trademark Office*